3,043,720
CELLULOSIC MATERIALS PLASTICIZED WITH HYDROXYPROPYLSUCROSE

Arthur W. Anderson, George K. Greminger, Jr., and Garth H. Beaver, Midland, Mich., assignors to The Dow Chemical Company, Midland, Mich., a corporation of Delaware
No Drawing. Filed May 28, 1957, Ser. No. 662,018
4 Claims. (Cl. 117—144)

This invention relates to plasticized cellulosic materials. By the latter term we mean materials consisting primarily of cellulose, in either its natural or regenerated state, such as paper, cellophane and the like.

Sucrose is an abundant and inexpensive compound which possesses eight reactive hydroxyl groups. In unmodified form it is useless as a plasticizer but by making derivatives it can be made more useful. Attempts have been made to produce plasticizers from sucrose by esterifying or etherifying the hydroxyl groups but they have not been notably successful. Alkylene oxides have been condensed with sucrose to produce derivatives having surface-active properties but these derivatives have not been useful as plasticizers.

Cellulosic materials require plasticization to avoid excessive brittleness. The most commonly used plasticizers are the lower polyols such as glycols and glycerol.

These suffer the handicap of excessive fugacity in that they readily evaporate or migrate to other materials. Attempts to minimize these defects have usually involved increasing the molecular weight by making various derivatives of the polyols; however, such derivatives have generally suffered from equally serious handicaps, such as incompatibility, inefficiency, toxicity, or excessive cost.

It is an object of this invention to provide a novel plasticizer for cellulosic materials that is permanent, effective, non-toxic and inexpensive. Other objects will appear hereinafter.

According to the invention, cellulosic materials are effectively and permanently plasticized by the incorporation therein of a suitable amount of octakis(2-hydroxypropyl)sucrose, a compound in which each of the eight hydroxyl groups of sucrose is etherified with a 2-hydroxypropyl group. As a matter of brevity and convenience, this compound will be referred to hereinafter as hydroxypropylsucrose.

The hydroxypropylsucrose used in the practice of the invention may be made by any known method, a convenient one being that disclosed in the copending application of Arthur W. Anderson, Serial No. 630,067, filed December 24, 1956, now Patent No. 2,927,918. It is essential that the hydroxypropylsucrose not contain any significant amount of polyoxypropylene groups, since such groups reduce the effectiveness of the plasticizer and may render it toxic.

The amount to be used in plasticizing cellulosic materials depends very largely on the particular material being plasticized and on the degree of plasticization desired. Thus, as little as 3% by weight significantly reduces the brittleness and increases the flexibility of cellophane and paper. On the other hand, as much as 50 to 60% or more, might well be used in highly plasticized products such as crepe paper, window curtains, glassine paper and the like. In cellophane, the usual amount is about 10 to 20%, though more or less may be used for special effects.

Hydroxypropylsucrose may be incorporated into cellulosic materials that are to be plasticized by any convenient method and at any convenient point in the manufacture of the cellulosic product. Thus, cellophane may be plasticized by pasing the wet, swollen gel sheet through an aqueous solution of the plasticizer, the pick-up being regulated by adjustment of the concentration of the plasticizer in the bath and the time the sheet is immersed therein. Similarly, paper may be plasticized by passing the wet or dry sheet through an aqueous solution of the plasticizer. Alternatively, the plasticizer or a solution thereof may be sprayed onto the paper at an appropriate point in its manufacture.

Hydroxypropylsucrose is an effective plasticizer for cellulosic plastics, such as cellulose ethers and esters, particularly for methylcellulose, ethylcellulose and cellulose acetate, propionate and acetobutyrate. It may be incorporated into such plastics by the usual methods and in the usual amounts.

The practice of the invention is illustrated by the following examples.

EXAMPLE 1

Freshly prepared regenerated cellulose films of about 1.5 mils thickness were immersed in a 10% aqueous solution of hydroxypropylsucrose, drained and dried. They were then found to be soft, flexible and tough and had an ultimate elongation of 21.8%, as compared to 16.6% for similar but unplasticized films. More highly plasticized films were obtainable by use of a more concentrated solution of the plasticizer. Because of the high molecular weight of the plasticizer, losses by volatilization and migration, even at elevated temperatures, were negligible.

EXAMPLE 2

Sheets of 27 lb. parchment paper were soaked for 10 minutes in aqueous solutions of hydroxypropylsucrose of 10 and 20% concentrations, the excess solution was blotted off and the sheets were dried in frames for 15 minutes at 80° C. The pick-up from the two solutions was 9.2 and 16.2% respectively.

After being conditioned for 48 hr. at 75° F. and 50% relative humidity the sheets were tested. Burst strength was determined by the TAPPI Mullen test. Tensile strength was measured with a Scott X-5 tensile tester, the samples being 1 cm. strips running in the machine direction on the paper. Stiffness was measured with a Gurley stiffness tester, the sample size being 2 x 1.5 inches. A 5 gram weight was used at 1 inch from the center and the sample was bent in the cross-machine direction. Plasticizer permanence was determined by aging the plasticized samples for 14 days at 135° F. and the measuring plasticizer loss and stiffness. Some typical results of these tests are shown in Table I, wherein the values recorded are averages of several replications of the tests. Comparable data are shown on unplasticized paper and on paper plasticized with glycerol, a widely used softener.

Table I.—Properties of Plasticized Paper

UNPLASTICIZED CONTROL

| Plasticizer Content, Percent | Tensile Strength, Kg./cm. | Bursting Strength, p.s.i. | Stiffness, mg. | | Plasticizer Loss, Percent During Aging |
|---|---|---|---|---|---|
| | | | Initial | Aged | |
| 0 | 3.84 | 29.6 | 13.8 | 17.2 | 0 |

PLASTICIZED WITH GLYCEROL

| 9.8 | 3.12 | 25.6 | 11.8 | 23.6 | 17.2 |
| 19.5 | 2.69 | 22.7 | 10.3 | 24.4 | 52.7 |

PLASTICIZED WITH HYDROXYPROPYLSUCROSE

| 9.2 | 3.02 | 22.8 | 11.0 | 17.5 | 0.0 |
| 16.2 | 2.45 | 22.3 | 11.4 | 17.6 | 0.0 |

The data in Table I show that hydroxypropylsucrose is an effective plasticizer for paper and is outstanding in its permanence when so used. This feature is even more striking when higher percentages of plasticizer are used in the paper.

A major advantage of hydroxypropylsucrose as a plasticizer for cellulosic materials is its low hygrosocopicity, as compared to glycerol and glycols. This is important because it minimizes changes in properties caused by changes in the humidity and temperature of the surroundings. This property is illustrated by the data in Table II, wherein the hygroscopicity of hydroxypropylsucrose is compared with that of glycerol and propylene glycol, two widely used plasticizers for cellulosic materials.

*Table II.—Equilibrium Moisture Content*

| Relative Humidity, Percent | Percent Moisture Content | | |
|---|---|---|---|
| | Hydroxy-propylsucrose | Glycerol | Propylene Glycol |
| 20 | 3 | 6 | 7.5 |
| 40 | 6 | 15 | 15 |
| 60 | 8 | 27 | 27 |
| 80 | 19 | 44 | 47 |
| 90 | 30 | 56 | 67 |

We claim:
1. A cellulosic material containing, as a plasticizer therefor, octakis-(2-hydroxypropyl) sucrose.
2. A process for producing plasticized cellulosic materials comprising impregnating into said materials an effective amount of octakis(2-hydroxypropyl)sucrose.
3. Paper containing, as a plasticizer therefor, octakis-(2-hydroxypropyl)sucrose.
4. Cellophane containing, as a plasticizer therefor, octakis(2-hydroxypropyl)sucrose.

References Cited in the file of this patent
UNITED STATES PATENTS

| | | |
|---|---|---|
| 1,863,208 | Schorger | June 14, 1932 |
| 1,959,930 | Schmidt et al. | May 22, 1934 |
| 2,312,708 | Gellendien et al. | Mar. 2, 1943 |
| 2,418,752 | Brown | Apr. 8, 1947 |
| 2,450,079 | Brown | Sept. 28, 1948 |
| 2,527,970 | Sokal | Oct. 31, 1950 |
| 2,552,528 | De Groate | May 15, 1951 |
| 2,562,884 | Barham | Aug. 7, 1951 |
| 2,636,833 | Borden | Apr. 28, 1953 |
| 2,666,713 | Lang et al. | Jan. 19, 1954 |
| 2,697,046 | Brandner | Dec. 14, 1954 |
| 2,733,238 | Kerr et al. | Jan. 31, 1956 |
| 2,927,918 | Anderson | Mar. 8, 1960 |